United States Patent Office 3,092,629
Patented June 4, 1963

3,092,629
SPIROLACTONES
Albert Bowers and Pierre Crabbé, Mexico City, Mexico, assignors, by mesne assignments, to Syntex Corporation, a corporation of Panama
No Drawing. Filed Jan. 17, 1962, Ser. No. 166,949
12 Claims. (Cl. 260—239.57)

The present invention relates to novel cyclopentanophenanthrene derivatives and to a process for the production thereof.

More particularly the present invention relates to 16,16-difluoro-17-(γ-spirolactone) derivatives of the androstane series and to novel intermediates in the production thereof.

The novel compounds of the present invention which are potent diuretic and aldosterone blocking agents, having also cholesterol lowering and anti-estrogenic properties are represented by the following formulas:

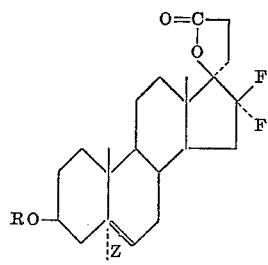
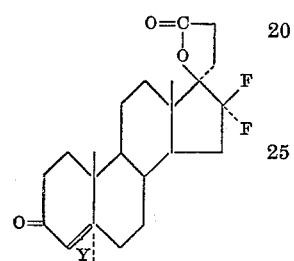

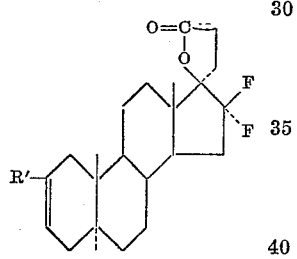

In the above formulas Z represents a double bond or a saturated linkage between C–5 and C–6; Y represents a double bond or a saturated linkage between C–4 and C–5; R represents hydrogen or a hydrocarbon carboxylic acyl group of less than 12 carbon atoms and $R^1$ represents hydrogen, methyl or formyl.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process exemplified as follows:

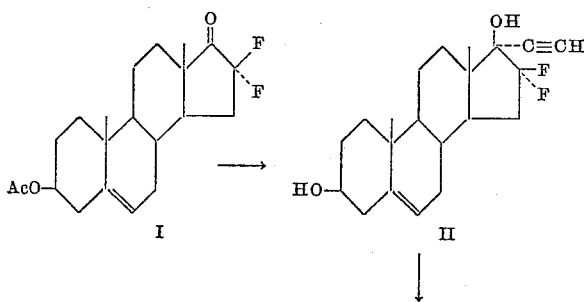

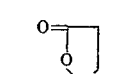
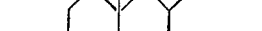

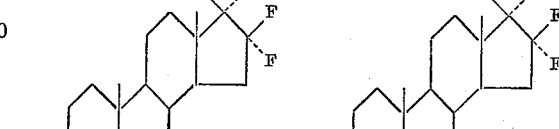

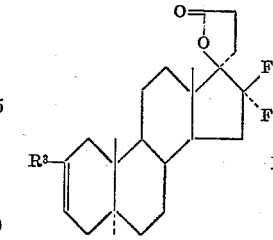
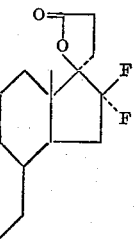

XI: $R^3$=hydrogen
XII: $R^3$=methyl

VII

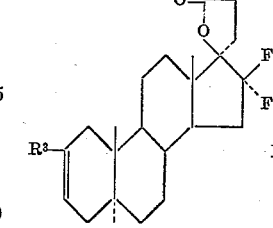

IX: X=keto
X: X=hydroxy

VIII

In the above formulas $R^2$ represents hydrogen or methyl and Ac represents the acetyl group; and Y and Z have the same meaning as defined above.

In practicing the process outlined above, an ester of $\Delta^5$-androsten-3β-ol-17-one, preferably the acetate is treated with ethyl formate in the presence of an alkali metal hydride such as sodium hydride and the formed sodium salt is hydrolyzed in an acid medium to give the corresponding 16-hydroxymethylene derivative, which upon treatment with perchloryl fluoride, in the presence of an alkali metal lower alkoxide, such as potassium ter-butoxide, affords the corresponding 16,16-difluoro derivative (I). This compound is treated with acetylene in the presence of an alkali metal lower alkoxide such as potassium ter-amyl oxide, thus giving the 16,16-difluoro-17α-ethynyl-$\Delta^5$-androstene- 3β,17β-diol (II) which upon reaction with methyl magnesium halide, as for example the bromide, and carbon dioxide yields the corresponding 17α-(2′-carboxyethynyl) derivative (III). Treatment of this latter acid with hydrogen in the presence of pyridine and a suitable catalyst such as 5% palladium on calcium carbonate leads to the formation of the 16,16-difluoro-17α-(2′-carboxyvinyl)-$\Delta^5$-androstene-3β,17β-diol-lactone (IV) which on further hydrogenation in the presence of a more active catalyst such as 5% palladium on carbon in a suitable solvent such as methanol, yields the respective saturated lactone (V: Z=double bond). Oxidation of this compound under Oppenauer conditions yields the corresponding 3-keto-$\Delta^4$-androstene saturated lactone derivative (VI: Y=double bond). Hydrogenation of the above mentioned 3β-hydroxy-$\Delta^5$-androsten-17-spirolactone (V: Z=double bond) in the presence of a very active catalyst such as platinum oxide affords the corresponding saturated compound 16,16-difluoro-17α-(2′-carboxyethyl)-androstane-3β,17β-diol-lactone (V: Z=saturated linkage) which upon oxidation, preferably under Oppenauer conditions, yields the respective 3-ketone (VI: Y=saturated linkage).

This latter compound is hydrolyzed in a basic medium, such as sodium hydroxide solution, to give the sodium salt of the acid resulting from the opening of the lactone ring. Treatment of this salt with ethyl formate in the presence of an alkali metal hydride such as sodium hydride, followed by acid hydrolysis of the double sodium salt gives 2-hydroxymethylene-16,16-difluoro-17α-(2′-carboxyethyl)-androstan-17β-ol-3-one-lactone (VII; $R^2$=hydrogen). Methylation of the 2-hydroxymethylene group of the latter compound with a methylating agent, as for example diazomethane yields the corresponding 2-methoxymethylene derivative (VII: $R^2$=methyl) which upon reduction of the 3-keto group followed by acid hydrolysis of the resulting 3β-hydroxy compound furnishes the corresponding 2-formyl-16,16-difluoro-17α-(2′-carboxyethyl)-$\Delta^2$-androsten-17β-ol-lactone (VIII).

The aforementioned 2-hydroxymethylene compound (VII: $R^2$=H) upon hydrogenation in a suitable solvent such as methanol in the presence of a catalyst such as 10% palladium on charcoal, followed by treatment with an alkali metal hydroxide, in order to transform totally the formed 2-methyl compound into the 2α-methyl isomer, and subsequent neutralization with an acid, yields 2α-methyl-16,16-difluoro-17α-(2′-carboxyethyl)-androstan-17β-ol-3-one-lactone (IX). Reduction of the 3-keto group of the preceding compound affords the respective 3β-hydroxy derivative (X).

Upon treatment of the aforementioned 3β-hydroxy-androstane derivatives (V: Z=saturated bond and X) with tosyl chloride in pyridine and subsequent reaction of the formed 3β-tosylates with sodium acetate in acetic acid furnish the corresponding $\Delta^2$-androstene compounds (XI, XII).

The 3β-hydroxy-17-spirolactones described above are conventionally acylated in pyridine with an acylating agent, as for example the anhydride of a hydrocarbon carboxylic acid of the type described hereinbefore, to yield the corresponding 3β-acylates.

The following specific examples serve to illustrate but are not intended to limit the scope of the present invention:

Example I

To a solution of 3 g. of $\Delta^5$-androsten-3β-ol-17-one acetate in 60 cc. of anhydrous benzene was added 3 cc. of ethyl formate and 1.3 g. of sodium hydride, suspended in mineral oil while cooling and stirring under an atmosphere of nitrogen. The mixture was stirred for 24 hours at room temperature, hexane was added until complete precipitation, the solid was collected and dried under vacuum. The crude material was suspended in aqueous hydrochloric acid and stirred at room temperature for half-hour. The precipitate was collected, washed with water and dried. Recrystallization from methylene chloride-hexane gave 16-hydroxymethylene-$\Delta^5$-androsten-3β-ol-17-one-3-acetate.

Into a mixture of 3 g. of the latter compound, 100 cc. of terbutanol and 40 g. of potassium terbutoxide, there was passed a current of perchloryl fluoride for 5 hours at 35° C. The reaction vessel was then closed and the mixture let stand overnight at room temperature. Water was added and the product extracted with ethyl acetate. The organic layer was successively washed with an aqueous potassium carbonate solution, water to neutral, dried over anhydrous sodium sulfate and evaporated to dryness. Recrystallization from acetone-hexane yielded 16,16-difluoro-$\Delta^5$-androsten-3β-ol-17-one-3-acetate.

Example II

A solution of 1 g. of the product of the preceding example in 30 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene (2:3) fractions a product, which upon recrystallization from acetone-hexane afforded the pure 16,16-difluoro-17α-ethynyl-$\Delta^5$-androstene-3β,17β-diol.

Example III

A solution of 1 g. of the latter steroid in 10 cc. of anhydrous tetrahydrofuran was added to a refluxing solution of 6 cc. of 3 M. methyl magnesium bromide in 15 cc. of tetrahydrofuran. The resulting suspension was stirred and refluxed for 24 hours. A slight positive pressure of carbon dioxide was then maintained over the stirred mixture, for approximately 24 hours. The mixture was thereafter poured into ice cold 0.2 M. sulfuric acid and most of the solvent removed by vacuum distillation. The crude precipitated product was filtered off, washed with water to neutral and dried. Recrystallization from acetone-hexane afforded 16,16-difluoro-17α-carboxyethynyl-$\Delta^5$-androstene-3β,17β-diol.

Example IV

A solution of 1 g. of the preceding steroid in 40 cc. of dioxane and 4 cc. of pyridine was hydrogenated at 25° C. and 570 mm. in the presence of 400 mg. of pre-hydrogenated 5% palladium calcium carbonate catalyst.

When 1.1 molar equivalent of hydrogen had been absorbed, the reaction was stopped, the catalyst separated by filtration through celite, washed with ethyl acetate and the combined solutions evaporated to dryness in vacuo, yielding the crude lactone. This crude product was dissolved in ethyl acetate, the organic solution washed with dilute hydrochloric acid and water to neutral, dried and evaporated to dryness. Recrystallization from acetone gave 16,16-difluoro-17α-(2′-carboxyvinyl)-$\Delta^5$-androstene-3β,17β-diol-lactone.

Example V

A suspension of 0.5 g. of 5% palladium on carbon catalyst in 50 cc. of methanol was hydrogenated for 30 minutes. A solution of 2 g. of the preceding lactone in 200 cc. of methanol was added to the catalyst and stirred under a hydrogen atmosphere until the uptake of hydrogen ceased. After removal of the catalyst by filtration the solution was evaporated and the crude residue was purified by crystallization from methylene chloride-hexane, thus giving 16,16-difluoro-17α-(2′-carboxyethyl)-$\Delta^5$-androstene-3β,17β-diol-lactone.

Example VI

A solution of 1 g. of the latter lactone in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid was added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 16,16 - difluoro-17α-(2'-carboxyethyl)-$\Delta^4$-androsten-17β-ol-3-one-lactone.

*Example VII*

A solution of 2.0 g. of 16,16-difluoro-17α-(2'-carboxyethyl)-$\Delta^5$-androstene-3β,17β-diol-lactone in 100 cc. of ethyl acetate was shaken with 100 mg. of platinum oxide catalyst in a hydrogen atmosphere until the gas uptake corresponded to one mol. The catalyst was filtered off and the filtrate evaporated to dryness. Recrystallization from acetone-hexane afforded 16,16-difluoro-17α-(2'-carboxyethyl)-androstane-3β,17β-diol-lactone.

*Example VIII*

Upon treatment of the last named steroid by the procedure described in Example VI, there was obtained 16,16-difluoro-17α-(2'-carboxyethyl)-androstan - 17β - ol-3-one-lactone.

*Example IX*

A solution of 3 g. of the latter product in 50 cc. of methanol was refluxed for 3 hours with 1.5 g. of sodium hydroxide dissolved in 10 cc. of water. The resulting mixture was then concentrated to a small volume under vacuum, ice-water was added, the precipitate filtered off, washed with ice-cold water and dried under vacuum thus yielding the sodium salt of the 16,16-difluoro-17α-(2'-carboxyethyl)-androstan-17β-ol-3-one.

*Example X*

To a suspension of 3 g. of the above sodium salt in 60 cc. of anhydrous benzene was added 3 cc. of ethyl formate, 20 cc. of tetrahydrofuran and 1.3 g. of sodium hydride, suspended in mineral oil while cooling and stirring under an atmosphere of nitrogen. The mixture was stirred for 24 hours at room temperature, hexane was added until complete precipitation and the solid was collected and dried under vacuum. The crude material was suspended in aqueous hydrochloric acid and stirred at room temperature for half an hour. The precipitate was collected, washed with water and dried. Recrystallization from ethylene chloride-hexane gave 2-hydroxymethylene-16,16-difluoro - 17α - (2'-carboxyethyl)-androstan-17β-ol-3-one-lactone.

*Example XI*

To a solution of 3 g. of the latter 2-hydroxymethylene compound in 50 cc. of methylene chloride were added an excess of diazomethane in ether (obtained from nitrosomethylurea) and a few drops of methanol. The reaction mixture was kept at room temperature for 18 hours. The excess reagent was decomposed with acetic acid. The resulting mixture was poured into water, the organic layer washed to neutral and evaporated to dryness. Recrystallization from acetone-hexane afforded 2-methoxymethylene - 16,16-difluoro-17α-(2'-carboxyethyl) - androstan-17β-ol-3-one-lactone.

*Example XII*

A solution of 1 g. of sodium borohydride in 3 cc. of water was added to an ice-cooled solution of 1 g. of the latter steroid in 120 cc. of methanol and the mixture was allowed to stand for 16 hours at room temperature. Then it was cautiously acidified with hydrochloric acid and further stirred for thirty minutes. The resulting mixture was concentrated to small volume in vacuo and diluted with water. The product was extracted with ethyl acetate, the extract was washed with water, dried and evaporated. The solid residue was purified by crystallization from acetone-hexane to give 2-formyl-16,16-difluoro-17α-(2' - carboxyethyl) - $\Delta^2$ - androsten - 17β - ol-lactone.

*Example XIII*

7 g. of 2-hydroxymethylene-16,16-difluoro-17α-(2'-carboxyethyl)-androstan-17β-ol-3-one-lactone obtained according to Example X was dissolved in 300 cc. of methanol and mixed with 2.5% of a 10% palladium on charcoal catalyst. The mixture was hydrogenated at approximately 25° C. at atmospheric pressure until the absorption of hydrogen ceased. The catalyst was removed by filtration, 1 g. of potassium hydroxide in 6 cc. of water was added to the solution which was then kept for 1 hour at room temperature; acetic acid was added to neutrality, the solvent was completely removed under reduced pressure, water was added to the residue and the product was extracted with methylene dichloride. The extract was washed with water, dried over anhydrous sodium sulfate and evaporated to dryness under vacuum. Crystallization from acetone-hexane afforded 2α-methyl-16,16-difluoro - 17α - (2'-carboxyethyl)-androstan-17β-ol-3-one-lactone.

*Example XIV*

A solution of 6 g. of sodium borohydride in 90 cc. of methanol was added with stirring to a solution of 6 g. of the latter steroid in 140 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave 2α-methyl-16,16-difluoro-17α-(2'-carboxyethyl)-androstan-3β,17β-diol-lactone.

*Example XV*

A solution of 5 g. of the last named compound in 25 cc. of pyridine was cooled to 0° C. Under stirring, there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 3β-tosylate of the starting material.

The total crude compound was refluxed with 5 g. of anhydrous sodium acetate and 60 cc. of glacial acetic acid during 5 hours. Chloroform and water were added. The aqueous layer was extracted several times with chloroform and the combined organic extracts were washed with concentrated sodium bicarbonate solution, then with water, dried over sodium sulfate and evaporated to dryness. Chromatography and recrystallization of the solid fractions from acetone-hexane afforded 2-methyl-16,16-difluoro-17α-(2'-carboxyethyl) - $\Delta^2$ - androsten-17β-ol-lactone.

Following the above procedures, there was treated 16,16-difluoro-17α-(2'-carboxyethyl) - androstane - 3β,17β-diol-lactone, thus yielding 16,16-difluoro-17α-(2'-carboxyethyl)-$\Delta^2$-androsten-17β-ol-lactone.

*Example XVI*

A mixture of 1 g. of 16,16-difluoro-17α-(2'-carboxyethyl)-$\Delta^5$-androstene-3β,17β-diol-lactone, 4 cc. of pyridine and 2 cc. of acetic anhydride was kept at room temperature overnight, poured into ice water, the formed precipitate was filtered, washed with water and dried. Crystallization from acetone-hexane gave the 3-acetate of the starting compound.

By the same technique, there was treated 16,16-difluoro-17α-(2'-carboxyethyl) - androstane - 3β,17β - diol-lactone, thus yielding the corresponding 3-acetate thereof.

Example XVII

Following the technique described in the foregoing example but substituting acetic anhydride by propionic anhydride, caproic anhydride, cyclopentylpropionic anhydride and benzoyl chloride, there were obtained the 3-propionates, 3-caproates, 3-cyclopentylpropionates and 3-benzoates of the starting compounds of the said example.

We claim:
1. A compound of the following formula

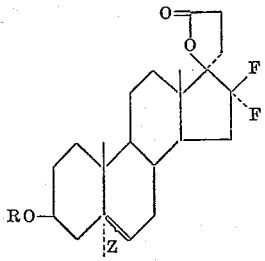

wherein Z is selected from the group consisting of a double bond and a saturated linkage between C–5 and C–6 and R is a member of the group consisting of hydrogen and a hydrocarbon carboxylic acyl group of less than 12 carbon atoms.

2. 16,16-difluoro - $17\alpha$ - (2'-carboxyethyl) - $\Delta^5$ - androstene-$3\beta,17\beta$-diol-lactone.
3. 16,16-difluoro - $17\alpha$ - (2'-carboxyethyl)-androstane-$3\beta,17\alpha$-diol-lactone.
4. 16,16-difluoro-$17\alpha$-(2' - carboxyethyl)-$\Delta^4$-androsten-$17\beta$-ol-3-one-lactone.
5. 16,16-difluoro-$17\alpha$-(2' - carboxyethyl-androstan-$17\beta$-ol-3-one-lactone.
6. $2\alpha$-methyl-16,16-difluoro - $17\alpha$ - (2' - carboxyethyl)-androstan-$17\beta$-ol-3-one-lactone.
7. $2\alpha$-methyl-16,16-difluoro - $17\alpha$ - (2' - carboxyethyl)-androstane-$3\beta,17\beta$-diol-lactone.
8. 2-methyl-16,16-difluoro - $17\alpha$ - (2'-carboxyethyl)-$\Delta^2$-androsten-$17\beta$-ol-lactone.
9. 2-formyl-16,16-difluoro - $17\alpha$ - (2'-carboxyethyl)-$\Delta^2$-androsten-$17\beta$-ol-lactone.
10. 16,16-difluoro - $17\alpha$ - (2' - carboxyethyl)-$\Delta^2$-androsten-$17\beta$-ol-lactone.
11. 2-hydroxymethylene-16,16-difluoro - $17\alpha$ - (2'-carboxyethyl)-androstan-$17\beta$-ol-3-one-lactone.
12. 2-methoxymethylene-16,16-difluoro - $17\alpha$ - (2'-carboxyethyl)-androstan-$17\beta$-ol-3-one-lactone.

No references cited.